April 19, 1949.    D. T. BRADLEY    2,467,548
RUBBER BUSHING
Filed April 25, 1947
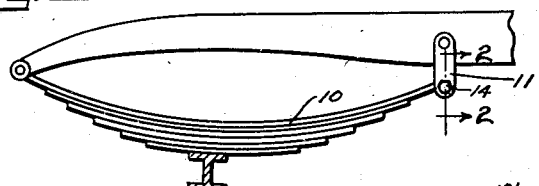
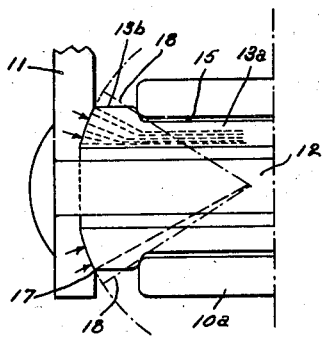
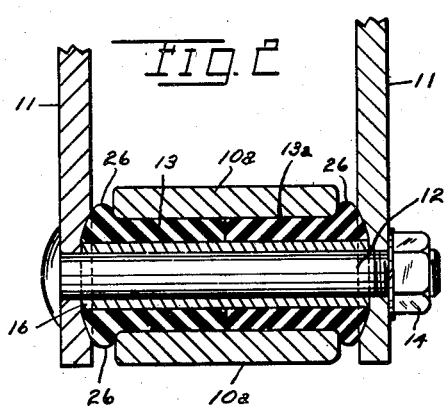
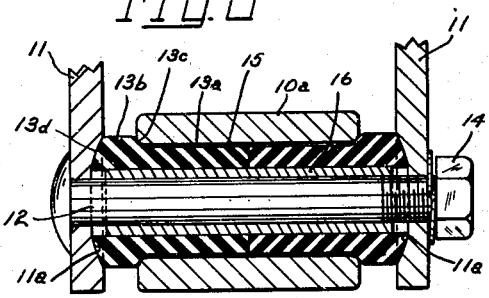
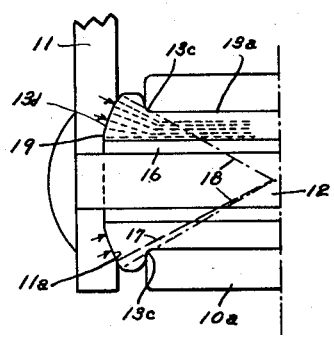
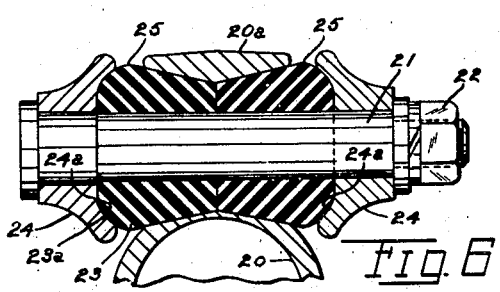
INVENTOR
DAN T. BRADLEY
By Hyde, Meyer, Baldwin & Doran
ATTORNEYS Patented Apr. 19, 1949

2,467,548

UNITED STATES PATENT OFFICE 2,467,548

RUBBER BUSHING

Dan T. Bradley, Shaker Heights, Ohio, assignor to Harris Products Company, Cleveland, Ohio, a corporation of Ohio Application April 25, 1947, Serial No. 743,968

2 Claims. (Cl. 287—85)

This invention relates to improvements in rubber bushings forming part of a pivotal connection.

One of the objects of the present invention is the provision of an improved annular bushing of rubber-like material adapted to be positioned between a central pintle and an embracing sleeve, together with means for applying compression at the outer end of the bushing in such a manner that the compression of the rubber-like material is increased far beyond that previously considered possible.

Another advantage of the present invention is that the manner of application of the compression to the rubber-like bushing prevents a swelling or escape of material between the compression member and the above mentioned sleeve, thereby making it possible to increase the clearance between the compression member and the sleeve.

Another object of the present invention is to provide an annular bushing of rubber-like material, as mentioned above, having an outer end face tapering outwardly and toward the center thereof, together with a compression member engaging said outer end face and generally conforming to the contour thereof whereby the lines of force resulting from the compression and extending at right angles to the end face of the bushing extend entirely within the confines of the embracing sleeve whereby certain valuable results are produced, as will presently appear.

Other objects and advantages of the present invention will be apparent from the accompanying drawings and description and the essential features thereof will be set forth in the appended claims.

In the drawings,

Fig. 1 is a side elevational view of a spring suspension illustrating one use for my improved invention;

Fig. 2 is an enlarged fragmental sectional view taken along the line 2—2 of Fig. 1;

Fig. 3 is a view of the parts of Fig. 2 before compression is applied;

Fig. 4 is a diagrammatic view illustrating the lines of force within the bushing as compression commences;

Fig. 5 is a diagrammatic view illustrating the position of the lines of force within the bushing upon the completion of compression; while Fig. 6 is a sectional view similar to Fig. 2 showing a modified form of my device.

The use of compressed annular bushings in pivotal connections is well known as disclosed in United States Patent 1,945,369, granted January 30, 1934, to Howard C. Harris. There was a limit to the pressure which could be applied to the rubber-like bushing of the said patented Harris connection and the compression members had to be spaced fairly close to the annular bushing sleeve as otherwise, the rubber-like material would escape between the confining surfaces. The present invention greatly increases the amount of compression which may be applied to the rubber-like material and greatly increases the possible dimension between the compression members and the sleeve embracing the bushing.

One use of my invention is illustrated in Fig. 1 as applied to the pivotal connection where the spring 10 is connected to the shackle 11. As is customary in such cases, the spring 10 is provided at its end with a spring eye 10a through which passes a pintle or bolt 12 for the purpose of securing the eye and shackle together. My improved bushing 13 of rubber-like material is adapted to be used in this location between the pintle and the embracing sleeve. The bushing comprises an annular body portion 13a and an outer end portion 13b which extends laterally beyond the sleeve 10a. The portion 13b is generally in the form of a thickened flange, as shown in Fig. 3 which extends beyond the internal diameter of the sleeve 10a. There is a shoulder 13c where the flange joins the body portion. The outer end face 13d of the bushing tapers outwardly toward the center of the bushing as shown in the various views. This tapering effect may be a convex curvature or a portion of a truncated cone.

The members through which compression is applied to the ends of the rubber-like bushing, in this case the shackles 11, are provided with concave recesses 11a which correspond in contour substantially to the end face 13d of the associated bushing. Compression is applied by screwing the nut 14 on the pintle bolt 12.

As viewed in Figs. 3 and 4, when the parts are placed in the position shown, there is a slight clearance between the body portion 13a of the bushing and the internal diameter of the sleeve 10a at the zone 15. This is exaggerated in the drawings because it is actually only a few thousandths of an inch. Preferably, two bushings are assembled end to end as shown on the sleeve 16 through the hollow center of which the pintle 12 passes. As clearly shown in Fig. 3, before the compression is applied, the rubber bushings extend laterally beyond the ends of the sleeve 16. As compression starts, the compression forces have components directed as shown by the arrows of Fig. 4. The lines of force within the bushing extend somewhat as indicated by the broken lines. There are no compression forces exerted outside of the dash lines 17 as shown in Figs. 4 and 5, but compression might be extended as far as the dot-dash lines 18 while still having the lines of force held entirely within the rubber bushing. It will be noted that these lines of force normal to the coacting surfaces 11a and 13d pass through the plane where the flange 13b joins the body portion 13a of the bushing wholly within the internal diameter of the sleeve 10a. When the compression is completed as shown in Figs. 2 and 5, the lines of force normal to the coacting surfaces 11a and 13d are still wholly confined to the rubber bushing and pass into the body portion 13a wholly within the confines of the sleeve 10a and entirely miss the shoulder 13c as clearly indicated in Fig. 5. At this time, the end of the bushing is flush with the end of sleeve 10. If necessary or desirable, a slight portion of the end face 13d as indicated at 19 may extend radially outwardly from the end of tube 16 before the taper begins.

In the modification of Fig. 6, I have shown a support for a torque tube 20 wherein a portion of the tube and a sleeve 20a are integrally formed to provide functions similar to the sleeve 10a of the first described modification. A central pintle 21 is of bolt form and provided with a nut 22. The outer end faces of the rubber-like bushing 23 are convex outwardly as indicated at 23a. These bushings are assembled end to end on the pintle 21 between compression collars 24. These collars are provided with concave surfaces 24a which conform generally to the convex end faces 23a of the bushings. When pressure is applied by threading the nut 22 on the pintle bolt 21 the collars 24 are urged toward each other and apply compression to the bushing 23. There is very little swelling of the rubber at the points 25 during this compression operation because the lines of force normal to the surfaces 23a and 24a lie wholly within the rubber bushing and pass directly into the body of the bushing embraced by the sleeve 20, 20a. Here again, the principle is the same as that of the first described modification.

The rubber-like material of which these bushings are made is substantially incompressible and pressure is transmitted through the bushing material in a similar manner to the transfer of pressure through an incompressible fluid. It results from this fact that the pressure applied at the ends of my improved rubber bushing is distributed through all portions of the bushing and presses the rubber-like material firmly against all confined surfaces. With my improved construction it is possible to greatly increase the pressure over that possible with the Harris pivotal connection patented in 1934, as mentioned above. The improved bushing of the present disclosure will run from three to four times longer than the above mentioned patented Harris bushing under the same test conditions.

Referring to Fig. 2, it will be noted that the rubber-like material swells outwardly at the points 26 when compression is applied. In the Harris patented bushing mentioned above, such swelling became excessive if the compression was increased to the degree which I utilize with my improved bushing. I believe this swelling is decreased by my present invention because the lines of force are retained within the annular body portion of the bushing as described in connection with Figs. 4 and 5. I am thus enabled to increase the distance between the sleeve 10a and the compression member 11 twenty-five percent over that possible in the above mentioned Harris patented bushing. This gives longer fibers of the rubber-like material in the flange 13b to withstand the cushioning action at the points 26 and makes possible a greater clearance between the shackles 11 and the spring eye 10a which is very desirable. In the above mentioned Harris patented bushing, when pressure was applied excessive swelling occurred at the ends of the eye 10a, at points analogous to 26 (Fig. 2), before full pressure was transmitted to the center of the eye. With the device of the present application this does not occur and full pressure is developed at the center of the eye 10a giving uniform and tight pressure against all bushing-confining surfaces.

What I claim is:

1. In combination, a sleeve, a cylindrical member positioned axially of said sleeve, an annular bushing of rubber-like material positioned between said cylindrical member and said sleeve, the outer end face of said bushing tapering outwardly and toward the center thereof, a compression member engaging said outer end face and having a tapering face generally conforming to the contour of said bushing end face, there being a clear space laterally outside said bushing between said sleeve and said compression member beyond the tapering face thereof and means urging said compression member inwardly to cause said bushing to press against all confining surfaces, said end face and tapering face having engaging contours from which substantially all lines normal to said tapering face project entirely within the confines of the end opening of said sleeve.

2. In combination, a sleeve, a cylindrical member positioned axially of said sleeve, two annular bushings of rubber-like material having body portions positioned end to end between said cylindrical member and said sleeve, each of said body portions having an outer end portion extending beyond said sleeve and there provided with a thickened integral flange overlying the end of said sleeve, the outer end face of each of said bushings tapering outwardly and toward the center thereof, a compression member engaging each said outer end face and having a tapering face generally conforming to the contour of said bushing end face, there being a clear space laterally outside said bushing between said sleeve and compression member beyond the tapering face of the latter, means urging said compression members toward each other to cause said bushings to press against all confining surfaces, and each said end face and said associated tapering face having engaging contours from which substantially all lines normal to said tapering face project entirely within the confines of the adjacent end opening of said sleeve.

DAN T. BRADLEY.

REFERENCES CITED

The following references are of record in the file of this patent:

UNITED STATES PATENTS

| Number | Name | Date |
|---|---|---|
| 1,692,837 | Henry | Nov. 27, 1928 |
| 1,808,358 | Leipert | June 2, 1931 |
| 1,876,924 | Hastings | Sept. 13, 1932 |